United States Patent
Masuyama et al.

(10) Patent No.: US 9,310,712 B2
(45) Date of Patent: Apr. 12, 2016

(54) TONER CONVEYING ROLLER, MOLD USED FOR MANUFACTURING ROLLER AND METHOD FOR MANUFACTURING ROLLER

(75) Inventors: Toru Masuyama, Machida (JP); Kouta Kawano, Yokohama (JP); Wataru Takahashi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 89 days.

(21) Appl. No.: 13/123,119

(22) PCT Filed: Oct. 8, 2009

(86) PCT No.: PCT/JP2009/067574
§ 371 (c)(1),
(2), (4) Date: Apr. 7, 2011

(87) PCT Pub. No.: WO2010/041718
PCT Pub. Date: Apr. 15, 2010

(65) Prior Publication Data
US 2011/0206421 A1 Aug. 25, 2011

(30) Foreign Application Priority Data

Oct. 8, 2008 (JP) .................................. 2008-262077
Oct. 8, 2008 (JP) .................................. 2008-262124

(51) Int. Cl.
*G03G 15/08* (2006.01)
*B29C 33/42* (2006.01)

(52) U.S. Cl.
CPC ............ *G03G 15/0808* (2013.01); *B29C 33/42* (2013.01)

(58) Field of Classification Search
USPC ............................... 399/286; 425/98; 427/133
See application file for complete search history.

(56) References Cited

U.S. PATENT DOCUMENTS 4,786,936 A * 11/1988 Ikegawa et al. ............... 399/272
5,768,668 A    6/1998 Shiraki et al.

(Continued)

FOREIGN PATENT DOCUMENTS

CN   1794108 A    6/2006
JP   9-274373 A   10/1997

(Continued)

OTHER PUBLICATIONS

International Search Report for PCT/JP2009/067574 dated Jan. 26, 2010.

(Continued)

*Primary Examiner* — David Gray
*Assistant Examiner* — Sevan A Aydin
(74) *Attorney, Agent, or Firm* — Sughrue Mion, PLLC (57) ABSTRACT

An object of the present invention is to provide a toner-conveying roller that has high toner-conveying property and in which a roller-shape thereof is less likely to be transferred to the image, a mold capable of manufacturing said roller, and a method of manufacturing said mold. The toner-conveying roller according to the present invention has a shaft body and a urethane foam layer formed around the shaft body, and recesses and protrusions are irregularly formed on a circumference surface of the urethane foam layer. The mold for manufacturing the roller according to the present invention has recesses and protrusions irregularly formed on the inner surface of a mold for manufacturing the roller. The method of manufacturing a mold used for manufacturing a roller according to the present invention includes: a powder sintering step of applying particles on an inner surface of a mold member, and forming recesses and protrusions on the inner surface of the mold member by heating the mold member having the particles on the inner surface thereof to sinter the particles; or, a fluorine coating step of applying particles on an inner surface of a mold member, and forming recesses and protrusions on the inner surface of the mold member by coating the inner surface having the particles applied thereon with fluorine resin.

8 Claims, 4 Drawing Sheets

(56) References Cited

U.S. PATENT DOCUMENTS

| | | | |
|---|---|---|---|
| 6,459,874 B2 * | 10/2002 | Inoue et al. | 399/223 |
| 2002/0009304 A1 * | 1/2002 | Kin et al. | 399/55 |
| 2008/0175630 A1 | 7/2008 | Yasunaga et al. | |
| 2008/0193172 A1 | 8/2008 | Kusaba et al. | |

FOREIGN PATENT DOCUMENTS

| | | | |
|---|---|---|---|
| JP | 10-221953 A | 8/1998 | |
| JP | 2002-23487 A | 1/2002 | |
| JP | 3536598 B2 | 6/2004 | |
| JP | 2007-121698 A | 5/2007 | |
| JP | 4060591 B2 | 3/2008 | |
| JP | 2008-112150 A | 5/2008 | |
| JP | 2008-180890 A | 8/2008 | |

OTHER PUBLICATIONS

Chinese Office Action issued in corresponding Chinese Patent Application No. 200980147295.2, dated Aug. 31, 2012.

Japanese Office Action issued in corresponding Japanese Patent Application No. 2010-532961, dated Dec. 4, 2012.

Chinese Office Action dated May 21, 2013 issued in Chinese Patent Application No. 200980147295.2.

Chinese Office Action dated Nov. 14, 2013 issued in Chinese Patent Application No. 200980147295.2.

* cited by examiner

TONER CONVEYING ROLLER, MOLD USED FOR MANUFACTURING ROLLER AND METHOD FOR MANUFACTURING ROLLER

CROSS REFERENCE TO RELATED APPLICATIONS

This application is a National Stage of International Application No. PCT/JP2009/067574 filed Oct. 8, 2009, which claims priority from Japanese Patent Application No. 2008-262077 filed Oct. 8, 2008 and Japanese Patent Application No. 2008-262124 filed Oct. 8, 2008, the contents of all of which are incorporated herein by reference in their entirety.

TECHNICAL FIELD

The present invention relates to a toner-conveying roller for use in an electrophotographic device such as a copying machine, printer and facsimile. Further, the present invention relates to a mold used for manufacturing a roller, which is used for manufacturing the toner-conveying roller, and a method of manufacturing the mold used for manufacturing a roller. Yet further, the present invention relates to a roller manufactured by using the mold used for manufacturing the roller.

RELATED ART

Figure 6:
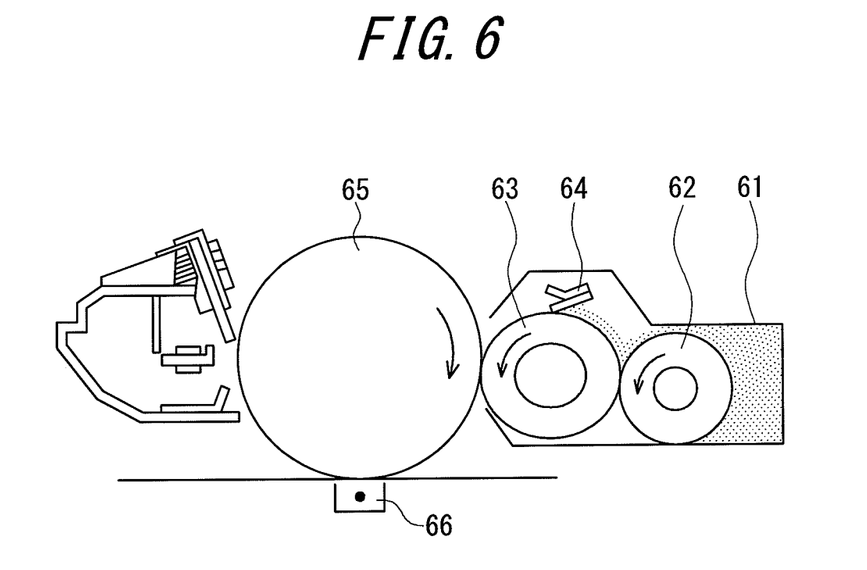
FIG. 6 is a schematic view illustrating one example of a known electrophotographic device.

In general, copying is performed by using an electrophotographic device, for example, through the following processes. More specifically, as illustrated in FIG. 6, copying can be performed by: (1) supplying toner in a toner box 61 to a surface of a developing roller 63 through a toner-conveying roller 62, (2) charging the toner existing on the surface of the developing roller 63 by triboelectric action between the developing roller 63 and the layer formation blade 64, (3) attaching the charged toner to an electrostatic latent image (original image) formed on the surface of a photoconductive drum 65 to form a toner image, and, (4) transferring and fixing the toner image on copy paper at a transfer section 66. Note that the toner not attached to the electrostatic latent image and remaining on the surface of the developing roller 63 is scraped off by the toner-conveying roller 62, and is collected into the toner box 61 so as to be reused.

Conventionally, the toner-conveying roller used for supplying the toner from the toner box to the developing roller is required, which has high toner-conveying capability, can provide favorable imaging property, and can favorably scrape off the toner left on the developing roller. As such a toner-conveying roller, there is proposed a roller whose surface has micro opening recesses (surface opening cell) with average opening diameter in a range of 150 to 300 μm for conveying the toner, by foaming and forming urethane foam integrally around a shaft body using a mold subjected to various works, as exemplarily illustrated below.

More specifically, for example, Patent Document 1 describes a roller having improved toner-conveying property and toner-scraping property, by forming, on the surface of the roller, protruding ridges extending in the axial direction (i.e. longitudinal direction) of the roller and having a height in a range of 20 to 3000 μm at pitches in a range of 300 to 3000 μm, the roller being manufactured using a mold that has recessed grooves extending in the axial direction of the roller in the inner surface of the mold, and formed by means of an etching process, electric discharging machining (wire cut), broaching machining, electroforming plating, casting, or the like.

Further, for example, Patent Document 2 describes a roller having improved toner-scraping property by forming, on the surface of the roller, large opening recesses having an average opening diameter in a range of 1000 to 3000 μm, the roller being manufactured using a mold that has hemisphere-like protrusions, on the inner surface of the mold, formed by means of an etching process.

Yet further, for example, Patent Document 3 describes a roller having improved toner-conveying property and toner-scraping property by regularly forming opening portions having an average equivalent-circle diameter in a range of 50 to 500 μm, the roller being manufactured using a mold that has plural protruding portions regularly arranged on the inner surface of the mold by using an electroforming process or ceramic shell molding process.

RELATED ART DOCUMENT

Patent Document

Patent Document 1: Japanese Patent No. 3536598
Patent Document 2: Japanese Patent Application Laid-open No. 2007-121698
Patent Document 3: Japanese Patent No. 4060591

DISCLOSURE OF THE INVENTION

Problem to be Solved by the Invention

However, with the roller having the large opening recesses according to the conventional arts described above, the number of the micro opening recesses existing on the roller surface and contributing to conveying the toner reduces, and hence, sufficient toner-conveying property cannot be obtained, although the toner-scraping property can be improved by the large opening recesses. Further, in the roller having protruding ridges extending in the axial direction of the roller, protrusions and recesses are regularly provided, and thus, marks resulting from the protruding ridges are transferred to an image, which deteriorates the image properties. Yet further, in the roller having openings with an average equivalent-circle diameter in a range of 50 to 500 μm at regular intervals, although the toner-conveying property can be obtained on a certain level, there is still room for improvement in that it is necessary to further increase the toner-conveying property in order to further improve the image properties. Therefore, there are demands for a toner-conveying roller having high toner-conveying property without transferring a shape of the roller to an image, and a mold capable of manufacturing said roller.

It should be noted that the above-described micro opening recess refers to a recess of a surface opening cell in a urethane foam, and the large opening recess refers to a recess resulting from a protruding portion on the surface of the mold.

As the molds according to the conventional arts described above are manufactured by using an etching process, electric discharging machining (wire cut), broaching machining, electroforming plating, casting, an electroforming process or ceramic shell molding process, there were problems of high cost and of requiring a long period of time to machine the mold at the time of forming deep recesses in the electric discharging machining (wire cut), electroforming plating, casting, electroforming process and ceramic shell molding process. Further, the broaching machining can only form groove-like protrusions and recesses. Yet further, the etching process and the casting require high manufacturing costs. Therefore, there has been a demand for a manufacturing method capable of easily manufacturing a mold, in a short period of time at low cost, which is used for manufacturing a roller that can achieve a high toner-conveying property and favorable imaging properties as described above.

Means for Solving the Problem

An object of the preset invention is to advantageously solve the problems above. A toner-conveying roller according to the present invention has a shaft body and a urethane foam layer integrally formed around the shaft body, in which recesses and protrusions are irregularly formed on a circumference surface of the urethane foam layer. According to said toner-conveying roller, the marks resulting from the protruding ridges can be prevented from being transferred to the image, since the circumference surface of the roller does not have regularly formed recesses and protrusions. This is because the toner supplied to the developing roller by the toner-conveying roller having irregularly formed recesses and protrusions can be easily leveled out by a layer formation blade. It should be noted that, even if an irregular image is transferred in a case where said toner-conveying roller is used, the transferred irregular image is less likely to be recognized as compared with the case where the regular image is transferred, as is the case with the conventional technique. Here, formation of irregular recesses and protrusions means that same shapes of recessed portions and protruding portions (recesses and protrusions) are not regularly formed in both of the circumferential direction and the axial direction of the urethane foam layer of the roller. Further, according to the toner-conveying roller of the present invention, the circumference surface of the urethane foam layer curves dues to the formed recesses and protrusions while being formed in an up and down shape, and hence, it is possible to provide a toner-conveying roller having significantly improved toner-conveying property as compared with that of the conventional techniques, due to the combination of micro opening recesses on the surface of the roller with said curve. This is because, according to the toner-conveying roller, the protrusions scrape up the toner, and the recesses maintain the toner scraped up by the protrusions until the toner is supplied to the developing roller. Further, this is also because the micro opening recesses help the protrusions in scraping up the toner, and prevent the toner from falling down and reliably maintain the toner.

Further, in the toner-conveying roller according to the present invention, the circumference surface of the roller preferably waves. As illustrated in an enlarged sectional view of FIG. 2 for example, which schematically illustrates one example of the toner-conveying roller according to the present invention, in a case where the circumference surface of the urethane foam layer waves, it is possible to provide a toner-conveying roller having significantly improved toner-conveying property as compared with that of the conventional techniques, due to the combination of micro opening recess on the surface of the roller with said wavy shape of the surface of the roller. This is because, since the toner in the toner box can be tapped and wound up in the case where the circumference surface of the toner-conveying roller waves, the fluidity of the toner in the toner box can be improved, and the flow of the wound-up toner can be made three-dimensional, whereby it is possible to improve the stirring property of the toner in the toner box. Note that the term "waving" or "wave" in this specification means that an arithmetic mean roughness Ra is 1 µm or more; a ten-point mean roughness Rzjis is 5 µm or more; and a mean length of roughness curve element RSm is 10 µm or more.

In the toner-conveying roller according to the present invention, it is preferable that an arithmetic mean roughness Ra of the circumference surface of the urethane foam layer in the circumferential direction is in a range of 5 to 100 µm, and, a ten-point mean roughness Rzjis of the circumference surface of the urethane foam layer in the circumferential direction is in a range of 20 to 400 µm. As a rotational direction of the roller is a direction in which the toner is transferred to the developing roller, it is particularly important to secure the sufficient amount of the toner to be conveyed by the toner-conveying roller in the circumferential direction of the roller. In this respect, by setting the Ra of the circumference surface of the urethane foam layer in the circumferential direction at 5 µm or more, and the Rzjis thereof at 20 µm or more, it is possible to sufficiently improve the toner-conveying property of the roller. Further, by setting the Ra of the circumference surface of the urethane foam layer in the circumferential direction at 100 µm or lower, and the Rzjis thereof at 400 µm or lower, it is possible to prevent the occurrence of the fluffing of the roller and the tearing of the urethane foam.

Yet further, in the toner-conveying roller according to the present invention, it is preferable that, in addition to the arithmetic mean roughness and the ten-point mean roughness in the circumferential direction, an arithmetic mean roughness Ra of the circumference surface of the urethane foam layer in the axial direction is in a range of 5 to 100 µm, and, a ten-point mean roughness Rzjis of the circumference surface of the urethane foam layer in the axial direction is in a range of 20 to 400 µm. With this configuration, the toner-conveying property of the roller can be further improved.

In the toner-conveying roller according to the present invention, it is preferable that a mean length of roughness curve element RSm of the circumference surface of the urethane foam layer in the axial direction is in a range of 100 to 2000 µm. If the toner slips down from the protrusions on the roller surface toward the circumferential direction of the roller while the roller is rotating, the amount of toner to be conveyed in the circumferential direction reduces. In this respect, by setting the RSm of the circumference surface of the urethane foam layer in the axial direction at 100 µm or more, the width of the protrusions on the circumference surface of the urethane foam layer in the axial direction becomes relatively wider, as compared with a case where the RSm is lower than 100 µm. Therefore, by increasing the width of the protrusions on the roller in the axial direction to prevent the toner from slipping down from the roller, it is possible to increase the amount of toner to be conveyed. Further, it is also possible to prevent the occurrence of the fluffing of the roller and the tearing of the urethane foam. On the other hand, by setting the RSm of the circumference surface of the urethane foam layer in the axial direction at 2000 µm or lower, it is possible to reliably prevent the protrusion mark resulting from the protrusion on the roller from being transferred to the image.

In the toner-conveying roller according to the present invention, it is preferable that a skewness of roughness curve Rsk of the circumference surface of the urethane foam layer in the circumferential direction is in a range of 0 to 2. By setting the Rsk of the roller in the circumferential direction at zero or more, it is possible to increase the volume of the portion on the surface of the roller that conveys the toner. On the other hand, by setting the Rsk of the roller in the circumferential direction at 2 or lower, it is possible to prevent the occurrence of the fluffing and the tearing of the urethane foam.

Figure 5:
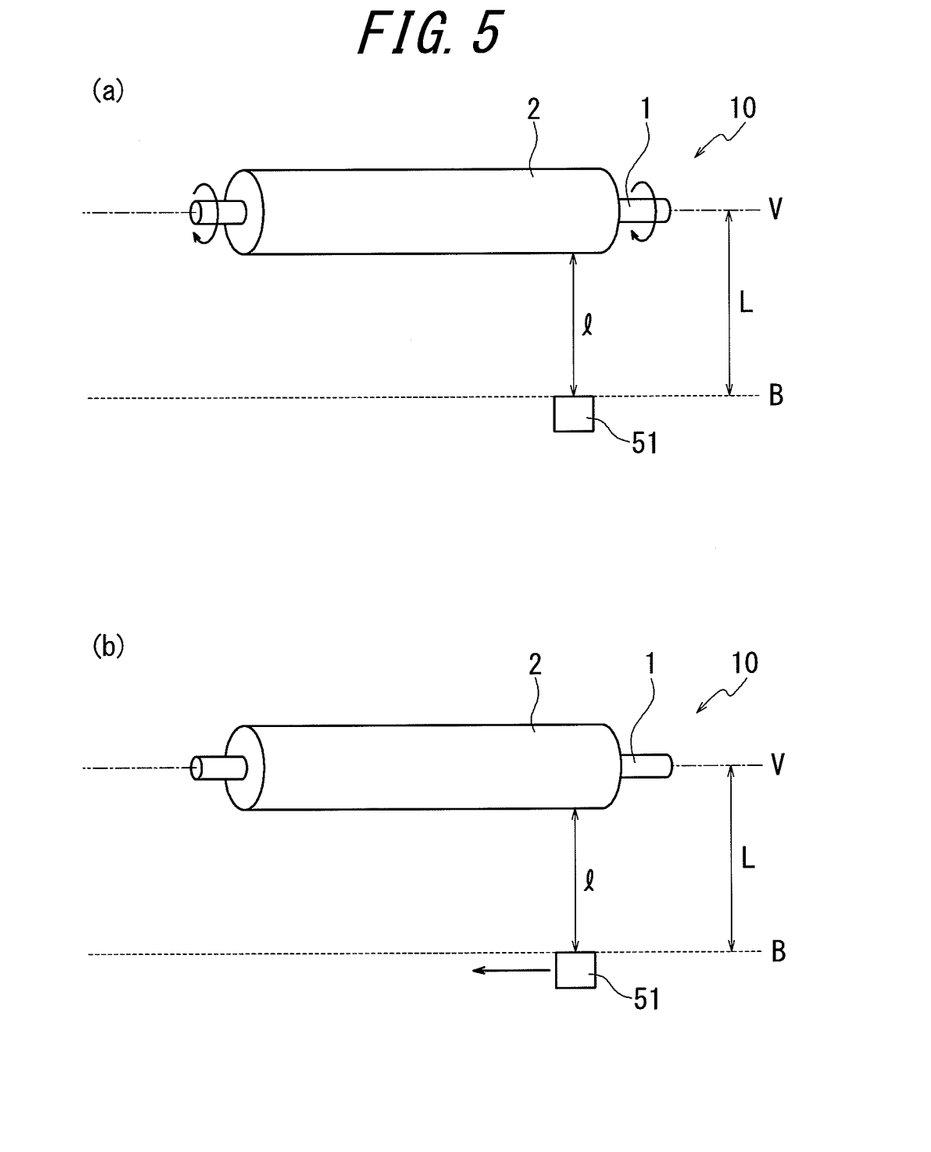
FIG. 5 is a diagram for explaining a method of measuring roughness on the circumference surface a urethane foam layer of the toner-conveying roller according to the present invention.

It should be noted that the Ra, Rzjis and Rsk of the circumference surface of the urethane foam layer in the circumferential direction can be evaluated by a method pursuant to the JIS B0633: 2001. As illustrated in FIG. 5(a) for example, the dimensional profiles of the roller in the circumferential direction at a predetermined position on the roller are measured by using a non-contact laser-type dimension measurement unit 51 (made by Keyence Corporation), by continuously measuring a distance 1 at the predetermined position on the roller 10 from a reference line B (line spaced away by distance L from an imaginary line V passing through a center of an axis body 1 of the roller in the axial direction of the roller) to the circumference surface of the urethane foam layer 2 while rotating the roller 10. Then, from the measured dimensional profiles, the Ra, Rzjis and Rsk in the circumferential direction can be obtained.

Further, the above-described Ra, Rzjis and RSm of the circumference surface of the urethane foam layer in the axial direction can be evaluated by a method pursuant to the JIS B0633: 2001. As illustrated in FIG. 5(b) for example, the dimensional profiles of the roller in the axial direction at a predetermined position on the roller are measured by using the non-contact laser-type dimension measurement unit 51 (made by Keyence Corporation), by measuring a distance 1 at the predetermined position on the roller from a reference line B (line spaced away by distance L from the imaginary line V passing through a center of an axis body 1 of the roller in the axial direction of the roller) to the circumference surface of the urethane foam layer 2 while continuously moving the non-contact laser-type dimension measurement unit 51 on the reference line in the axial direction (leftward in FIG. 5(b)). Then, from the measured dimensional profiles, the Ra, Rzjis and RSm in the axial direction can be obtained.

Further, another object of the present invention is to solve the problems described above, and a mold for manufacturing a roller according to the present invention has a substantially tubular mold for forming the roller, in which recesses and protrusions are irregularly formed on an inner surface of the mold. According to the mold for manufacturing the roller, the recessed portions and protruding portions (recess and protrusion) are irregularly formed on the inner surface of the mold. Therefore, the roller manufactured by using the mold does not have regularly formed recesses and protrusions, and hence, it is possible to manufacture the roller capable of preventing the marks resulting from protruding ridges from being transferred to the image as is the case with the conventional techniques. Here, formation of irregular recesses and protrusions means that same shapes of recessed portions and protruding portions are not periodically formed in both of the circumferential direction and the axial direction of the mold. Further, in the mold for manufacturing the roller, the inner surface of the mold curves due to the formed recesses and protrusions while being formed in an up and down shape. Therefore, a roller manufactured by using the mold has a curved surface in an up and down shape, and hence, it is possible to manufacture a roller having significantly improved toner-conveying property as compared with that of the conventional techniques, due to the combination of micro opening recesses on the surface of the roller with said curve.

Figure 4:
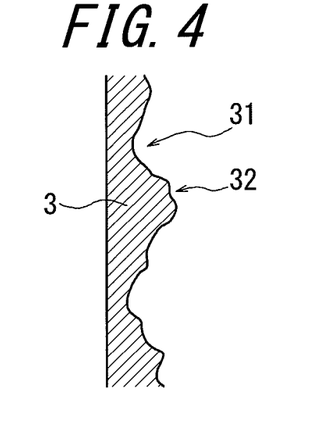
FIG. 4 is an enlarged sectional view schematically illustrating an enlarge cross-section of portion IV surrounded by the broken line in FIG. 3.

Further, in the mold for manufacturing the roller according to the present invention, it is preferable that the inner surface waves. As illustrated in an enlarged sectional view of FIG. 4 for example, which schematically illustrates one example of the mold according to the present invention, if the inner surface of the mold waves, the surface of the roller manufactured by using said mold also waves. Therefore, by using the mold having such a configuration, it is possible to manufacture the roller having significantly improve toner-conveying property as compared with that of the conventional techniques, due to the combination of micro opening recess on the surface of the roller with said wavy shape of the surface of the roller. Note that the term "waving" or "wave" in this specification means that: as described above, an arithmetic mean roughness Ra is 1 μm or more; a ten-point mean roughness Rzjis is 5 μm or more; and a mean length of roughness curve element RSm is 10 μm or more.

In the mold for manufacturing the roller according to the present invention, it is preferable that an arithmetic mean roughness Ra of the inner surface of the mold in the circumferential direction is in a range of 5 to 100 μm, and, a ten-point mean roughness Rzjis of the inner surface of the mold in the circumferential direction is in a range of 20 to 400 μm. As a rotational direction of the roller is a direction in which the toner is transferred to the developing roller, it is particularly important to secure the sufficient amount of the toner to be conveyed by the toner-conveying roller in the circumferential direction of the roller. In this respect, by setting the Ra of the inner surface of the mold in the circumferential direction at 5 μm or more, and the Rzjis thereof at 20 μm or more, it is possible to sufficiently improve the toner-conveying property of the roller manufactured by using said mold. Further, by setting the Ra of the inner surface of the mold in the circumferential direction at 100 μm or lower, and the Rzjis thereof at 400 μm or lower, it is possible to prevent the occurrence of the fluffing of the roller manufactured by using said mold and the tearing of the urethane foam.

Further, in the mold for manufacturing the roller according to the present invention, it is further preferable that, in addition to the arithmetic mean roughness and the ten-point mean roughness in the circumferential direction described above, an arithmetic mean roughness Ra of the inner surface of the mold in the axial direction is in a range of 5 to 100 μm, and, a ten-point mean roughness Rzjis of the inner surface of the mold in the axial direction is in a range of 20 to 400 μm. With this configuration, the toner-conveying property of the roller manufactured by using said mold can be further improved.

In the mold for manufacturing the roller according to the present invention, it is preferable that a mean length of roughness curve element RSm of the inner surface of the mold in the axial direction is in a range of 100 to 2000 μm. If the toner slips down from the protrusions on the roller surface toward the circumferential direction of the roller during rotation of the toner, the amount of toner to be conveyed in the circumferential direction reduces. In this respect, by setting the RSm of the inner surface of the mold in the axial direction at 100 μm or more, the width of the recesses on the inner surface of the mold in the axial direction increases. Therefore, by increasing the width of the protrusions in the axial direction on the roller manufactured by using said mold to prevent the toner from slipping down from the roller, it is possible to increase the amount of toner to be conveyed. Further, it is also possible to prevent the occurrence of the fluffing of the roller manufactured by using said mold and the tearing of the urethane foam. On the other hand, by setting the RSm of the inner surface of the mold in the axial direction at 2000 μm or lower, it is possible to prevent the protrusion mark resulting from the protrusion on the roller manufactured by using said mold from being transferred to the image.

In the mold for manufacturing the roller according to the present invention, it is preferable that a skewness of roughness curve Rsk of the inner surface of the mold in the circumferential direction is in a range of −2 to 0. When the Rsk of the mold in the circumferential direction is set in the range of −2 to 0, the Rsk of the roller manufactured by using said mold in the circumferential direction is in a range of 0 to 2. By setting the Rsk of the roller in the circumferential direction at zero or more, it is possible to increase the volume of a portion on the surface of the roller that conveys the tonner, and by setting the Rsk of the roller in the circumferential direction at 2 or lower, it is possible to prevent the occurrence of fluffing and tearing of the urethane foam.

It should be noted that the above-described Ra, Rzjis, RSm and Rsk of the inner surface of the mold can be evaluated by a method pursuant to the JIS B0633: 2001. This evaluation can be made, for example, by taking a test piece having a size of 10 mm×10 mm from the manufactured mold, and making measurement on the surface of the test piece in the circumferential and the axial directions using a probe-contacting-type surface roughness measurement unit (Surfcom 1400D made by TOKYO SEIMITSU CO., LTD.).

Further, a method of manufacturing a mold used for manufacturing a roller according to the present invention provides a method of manufacturing a mold used for manufacturing a roller, including: (1) a powder sintering step of applying particles on an inner surface of a substantially tubular mold member, and forming recesses and protrusions on the inner surface of the mold member by heating the mold member having the particles on the inner surface thereof to sinter the particles, thereby forming a substantially tubular mold; or, (2) a fluorine coating step of applying particles on an inner surface of a substantially tubular mold member, and forming recesses and protrusions on the inner surface of the mold member by coating the inner surface having the particles applied thereon with fluorine resin, thereby forming a substantially tubular mold. With this manufacturing method, it is possible to easily manufacture the mold in a short period of time at low cost, because the mold having the recesses and protrusions on the inner surface thereof can be manufactured only by subjecting the mold member having particles applied on the inner surface thereof to sintering or fluorine resin coating.

Further, the roller according to the present invention is manufactured by using the above-described mold for manufacturing a roller.

Effect of the Invention

According to the toner-conveying roller of the present invention, it is possible to provide a toner-conveying roller that has high toner-conveying property and in which a roller-shape thereof is less likely to be transferred to the image.

According to the mold for manufacturing a roller of the present invention, it is possible to provide a mold capable of manufacturing a toner-conveying roller that has high toner-conveying property and in which a roller-shape thereof is less likely to be transferred to the image.

According to the method of manufacturing a mold used for manufacturing a roller of the present invention, it is possible to easily manufacture a mold having recesses and protrusions on an inner surface of a mold in a short period of time at low cost.

According to the roller manufactured by using the mold for manufacturing a roller of the present invention, it is possible to provide a toner-conveying roller that has high toner-conveying property and in which a roller-shape thereof is less likely to be transferred to the image.

BRIEF DESCRIPTION OF THE DRAWINGS

FIG. 5($a$) illustrates a method of measuring roughness on the surface in the circumferential direction; and, FIG. 5($b$) illustrates a method of measuring roughness on the surface in the axial direction.

BEST MODE FOR CARRYING OUT THE INVENTION

Figure 1:
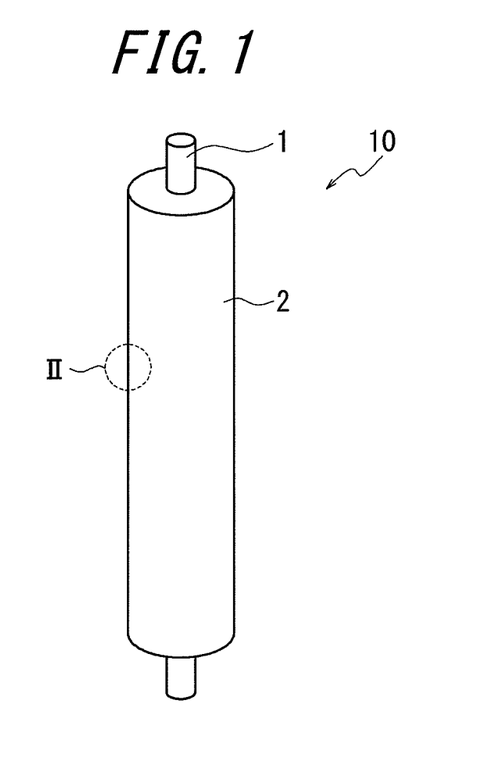
FIG. 1 is a front view illustrating a roller as one example of a toner-conveying roller according to the present invention.

A roller 10, which is one example of a toner-conveying roller according to the present invention, is formed by integrally combining a elastic body such as urethane foam with a shaft body, and includes a shaft body 1 and a substantially tubular urethane foam layer 2 provided on the outer periphery of the shaft body 1, as illustrated in FIG. 1. The circumference surface of the urethane foam layer 2 waves so as to have the aforementioned desired roughness [arithmetic mean roughness (Ra), ten-point mean roughness (Rzjis), mean length of roughness curve element (RSm), and skewness of roughness curve (Rsk)].

Further, as illustrated in FIG. 1, the toner-conveying roller 10 configured to form the substantially tubular urethane foam layer 2 around the shaft body 1 has a substantially cylindrical shape. On the circumference surface of the urethane foam layer 2, recesses and protrusions (recess 21 and protrusion 22) are irregularly formed, as illustrated in an enlarged schematic view of FIG. 2 in which a cross-section of portion II surrounded by the broken line in FIG. 1 is enlarged. Further, on the circumference surface of the urethane foam layer 2, cell opening portions 23 (opening diameter: 50-1000 μm) exist.

Figure 3:
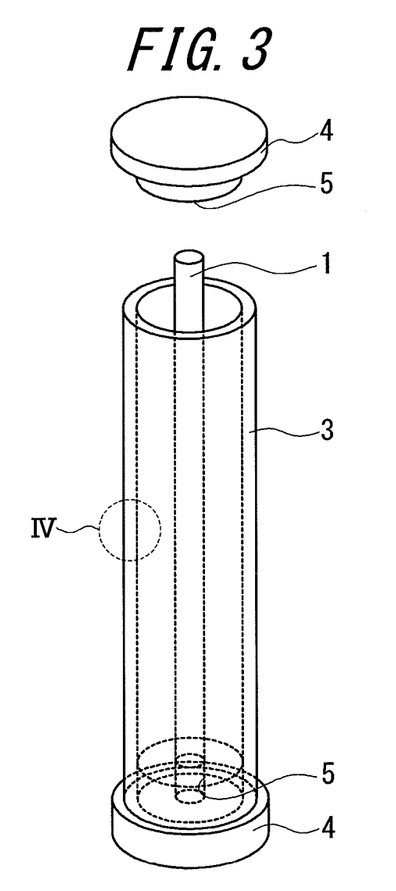
FIG. 3 is a front view illustrating a mold as one example of a mold for manufacturing a toner-conveying roller according to the present invention.

The roller 10 may be manufactured in accordance with an ordinary method by using a mold, which is one example of a mold for manufacturing a roller according to the present invention. The inner surface of the mold waves and has a desired inner surface roughness [arithmetic mean roughness (Ra), ten-point mean roughness (Rzjis), mean length of roughness curve element (RSm), and skewness of roughness curve (Rsk)]. More specifically, the toner-conveying roller 10 as illustrated in FIG. 1 may be manufactured, by using a mold including a tubularly shaped mold (tubular mold) 3 having a length substantially equal to a length of the roller to be formed in an axial direction as illustrated in FIG. 3, and detachable caps 4 that cover both ends of the tubular mold 3, the cap 4 being provided with a shaft-body supporting section 5 for supporting the shaft body 1 at the time of forming the roller, such that: after application of a mold-release agent such as silicon-based agent on the inner surface of the tubular mold 3 depending on application, the shaft body 1 is set as illustrated in FIG. 3; and, a raw-material mixture solution formed by adding additives a urethane foam material having a polyol component and an isocyanate component depending on application is introduced into the mold and is foamed to integrally form the urethane foam layer 2 around the shaft body 1.

Incidentally, the mold, which is one example of the mold for manufacturing the roller according to the present invention, is a mold for manufacturing the toner-conveying roller by integrally forming the elastic body such as a urethane foam on the shaft body. On the inner surface of the tubular mold 3, recesses and protrusions (recess 31 and protrusion 32) are irregularly formed, as schematically illustrated in an enlarged sectional view of FIG. 4 which enlarges the sectional area of portion IV surrounded by the broken line in FIG. 3. Further, due to the irregularly formed recesses and protrusions, the inner surface of the tubular mold 3 waves so as to have the aforementioned desired roughness [arithmetic mean roughness (Ra), ten-point mean roughness (Rzjis), mean length of roughness curve element (RSm), and skewness of roughness curve (Rsk)].

It should be noted that the irregularly formed recesses and protrusions on the circumference surface of the urethane foam layer 2 of the roller 10 are formed so as to correspond to the irregularly formed recesses and protrusions (recess 31 and protrusion 32) on the inner surface of the mold used for manufacturing the toner-conveying roller 10, and hence, it is possible to control the roughness on the circumference surface by adjusting the roughness on the inner surface of the mold. The roughness on the inner surface of the mold may be set, for example, such that, in both circumferential direction and axial direction, the arithmetic mean roughness (Ra) is in a range of 5 to 100 μm; the ten-point mean roughness (Rzjis) is in a range of 20 to 400 μm; the mean length of roughness curve element (RSm) is in a range of 100 to 2000 μm; and, the skewness of roughness curve (Rsk) is in a range of −2 to 0.

The tubular mold 3 having the desired roughness on the inner surface and whose inner surface waves (having irregular recesses and protrusions) can easily be manufactured at low cost by using the method described in the following (1) to (3) for example. More specifically, it is particularly preferable to manufacture using the method described in (2) and (3) below, from the viewpoint of making the skewness of the inner surface of the manufactured mold have a negative value (i.e. from the viewpoint of making the skewness of roughness of the roller manufactured by using the mold have a positive value).

(1) Blast

For example, abrasives such as alumina are blasted on the inner surface of a tubular member (mold member) formed by aluminum pipe (A6063) and the like to machine the inner surface of the tubular member, whereby it is possible to manufacture the tubular mold having the irregularly formed recesses and protrusions on the inner surface thereof. The roughness of the inner surface of the mold can be controlled by adjusting the particle diameter and shape of the abrasives, blasting pressure of the abrasives, and the period of time for which the abrasives are blasted (machining time).

(2) Powder Sintering

On the inner surface of the tubular member, for example, a binder such as a spray-type adhesive is applied depending on application; then, a metallic powder formed by copper or a mixture of copper and SUS is applied; and, the metallic powder is sintered, whereby it is possible to manufacture a tubular mold having the irregular recesses and protrusions on the inner surface thereof. The roughness of the inner surface of the mold can be controlled by adjusting particle diameters and the amount of the metallic powder applied, and sintering temperature. It should be noted that, when the binder is applied to sinter, the binder gasifies during the sintering process, and does not remain on the inner surface of the manufactured mold, and therefore, the formation of the roller is not adversely affected by the binder.

(3) Fluorine Coating

On the inner surface of the tubular member, particles made of resin such as PTFE or metal are applied; then, fluorine-based coating agent such as PTFE, PFA, FEP, PAI, and PEEK is applied on the inner surface having the particles applied thereon to coat the inner surface of the tubular member with the fluorine resin, whereby it is possible to manufacture the tubular mold having the irregular recesses and protrusions on the inner surface thereof. The roughness of the inner surface of the mold can be controlled by adjusting particle diameters, shape of the applied powder, and the application amount of the powder. It should be noted that, in a case of the mold manufactured by using this method, the inner surface of the mold is coated with fluorine resin, and thus, has a high mold release properties, and the fluffing is less likely to occur.

It should be noted that, in addition to the methods (1)-(3) described above, the tubular mold 3 may be manufactured by a rolling process using a die having irregular recesses and protrusions, or by rounding an emboss plate having irregular recesses and protrusions to be a pipe.

As the polyol component of the urethane foam material, it may be possible to employ polyether polyol obtained by addition polymerization of ethylene oxide and propylene oxide, polytetra methylene ether glycol, polyester polyol obtained by condensation of acid component and glycol component, polyester polyol obtained by ring-opening polymerization of caprolactone, polycarbonate diol and the like.

Examples of the polyether polyol produced by addition polymerization of ethylene oxide and propylene oxide include those produced by addition polymerization of ethylene oxide and propylene oxide using, as the starting material, water, propylene glycol, ethylene glycol, glycerin, trimethylolpropane, hexanetriol, triethanolamine, diglycerine, pentaerythritol, ethylenediamine, methylglucosite, aromatic diamine, sorbitol, sucrose, phosphate or the like, and those using, as the starting material, water, propylene glycol, ethylene glycol, glycerin, trimethylolpropane or hexanetriol are especially preferred. In terms of the ratios and microstructures of ethylene oxide and propylene oxide to be added in polyether polyol, the ratio of ethylene oxide is preferably in a range of 2 to 95% by mass, more preferably in a range of 5 to 90% by mass, and ethylene oxide is preferably added to the ends. Further, the sequence of ethylene oxide and propylene oxide in the molecular chain is preferably random.

Such a polyether polyol is bifunctional in a case where water, propylene glycol or ethylene glycol is used as the starting material, and its mass average molecular weight is preferably in a range of 300 to 6000, more preferably in a range of 3000 to 5000. Further, it is trifunctional in a case where glycerin, trimethylolpropane or hexanetriol is used as the starting material, and its mass average molecular weight is preferably in a range of 900 to 9000, more preferably in a range of 4000 to 8000. Further, a bifunctional polyol and a trifunctional polyol may be used after being blended together as appropriate. In a case where the numbers of functional group are small and are equal, it is desirable to make the molecular weight larger in order to achieve the high breaking extension of the urethane foam layer.

The polytetramethylene ether glycol can be obtained by, for example, cationic polymerization of tetrahydrofuran, and those having the mass average molecular weight in a range of 400 to 4000, especially in a range of 650 to 3000 are preferably used. Further, it is also preferred to use a mixture of polytetramethylene ether glycols having different molecular weights. Further, a polytetramethylene ether glycol obtained by copolymerization of alkylene oxides such as ethylene oxide and propylene oxide may also be used.

It is also preferred to use, as the polyol component, a mixture of a polytetramethylene ether glycol and a polyether polyol produced by addition polymerization of ethylene oxide and propylene oxide. In this case, it is further preferred to use mixtures having mixture ratio (polytetramethylene ether glycol:polyether polyol) in a range of 95:5 to 20:80 by mass, especially in a range of 90:10 to 50:50 by mass.

Further, in combination with the above-described polyol component, it may be possible to use a polymer polyol produced by acrylonitrile modification of a polyol, a polyol produced by addition of melamine to a polyol, diols such as butane diol, polyols such as trimethylolpropane, or a derivative thereof.

Examples of the isocyanate component used for the urethane foam material include aromatic isocyanates and derivatives thereof, aliphatic isocyanates and derivatives thereof, and alicyclic isocyanates and derivatives thereof. Among these, aromatic isocyanates and derivatives thereof are preferred, and tolylene diisocyanate (TDI) and a derivative thereof, and diphenylmethane diisocyanate (MDI) and a derivative thereof are especially preferably used.

As the tolylene diisocyanate or a derivative thereof, it may be possible to use crude tolylene diisocyanate; 2,4-tolylene diisocyanate; 2,6-tolylene diisocyanate; mixtures of 2,4-tolylene diisocyanate and 2,6-tolylene diisocyanate; their urea-modified products, biuret-modified products and carbodiimide-modified products, and urethane-modified products produced by modification with polyols or the like. As the diphenylmethane diisocyanate or a derivative thereof, it may be possible to use, for example, diphenylmethane diisocyanates and derivatives thereof obtained by phosgenation of diaminodiphenylmethane or a derivative thereof. The derivative of the diaminodiphenylmethane includes those which are polynuclear, and it may be possible to use pure diphenylmethane diisocyanate obtained from diaminodiphenylmethane and polymeric diphenylmethane diisocyanates obtained from polynuclear of diaminodiphenylmethanes. In terms of the number of functional groups of the polymeric diphenylmethane diisocyanate, a mixture of pure diphenylmethane diisocyanate and polymeric diphenylmethane diisocyanates having various numbers of functional groups is usually used, and those having the average numbers of functional groups of preferably 2.05 to 4.00, more preferably 2.50 to 3.50, are used. Further, it may also be possible to use derivatives obtained by modification of these diphenylmethane diisocyanates or derivatives thereof, for example, urethane-modified products modified with polyols or the like, dimers produced by uretidione formation, isocyanurate-modified products, carbodiimide/uretonimine-modified products, allophanate-modified products, urea-modified products and biuret-modified products. Further, it may also be possible to use a mixture of several types of diphenylmethane diisocyanates and derivatives thereof.

Further, the isocyanate may be prepolymerized in advance with a polyol, and examples of its method include a method in which a polyol and an isocyanate are placed in an appropriate container; the mixture is stirred sufficiently; and, then, the mixture is stored at 30 to 90° C., more preferably at 40 to 70° C., for 6 to 240 hours, more preferably for 24 to 72 hours. In this case, the ratio of the amounts of the polyol and the isocyanate is preferably adjusted such that the content of the isocyanate in the obtained prepolymer becomes 4 to 30% by mass, more preferably 6 to 15% by mass. In a case where the content of the isocyanate is less than 4% by mass, the stability of the prepolymer is deteriorated, and the prepolymer is cured during storage, so that the prepolymer may not be usable. In a case where the content of the isocyanate exceeds 30% by mass, the amount of the isocyanate to be added increases at the time of preparation, and, the content of the isocyanate which is not prepolymerized increases. This isocyanate, which is not prepolymerized, is cured with a polyol component used in the later polyurethane curing reaction by a reaction mechanism similar to the one-shot method that does not involve a prepolymerization reaction, so that the effect by using the prepolymer method decreases. As the polyol component in a case where the isocyanate component to be used is prepared by prepolymerization in advance of isocyanate with a polyol, it may be possible to use, in addition to the above-described polyol components, diols such as ethylene glycol and butanediol, polyols such as trimethylolpropane and sorbitol, and derivatives thereof.

In addition to these polyol components and isocyanate components, foaming agents (water, low-boiling materials, gaseous materials and the like), surfactants, catalysts, foam stabilizers and the like may be added as additives to the raw material mixture of the urethane foam, depending on application, which makes it possible to obtain a urethane foam having a desired structure. Further, it may be possible to use a fire retarding material, filler, conductive agent such as ion conductive agent and electronic conductive agent, known filler and cross-linking agent, depending on application.

The ion conductive agent include perchlorates, sulfate, alkyl sulfates, carboxylates, sulfonates and the like of tetraethylammonium, tetrabutylammonium, dodecyltrimethylammonium (lauryltrimethylammonium, for example), hexadecyltrimethylammonium, octadecyltrimethylammonium (stearyltrimethylammonium, for example), benzyltrimethylammonium, modified fatty acid dimethylethylammonium and the like; and, perchlorates, chlorates, hydrochlorides, bromates, iodates, hydrofluoroborates, trifluoromethylsulfates, sulfonates and the like of alkaline metals and alkaline earth metals such as lithium, sodium, potassium, calcium, magnesium and the like.

Further, examples of the electron conductive agent include conductive carbons such as Ketjen Black and acetylene black; carbons for rubbers such as SAF, ISAF, HAF, FEF, GPF, SRF, FT and MT; carbons for inks subjected to oxidation treatment, pyrolytic carbons, natural graphites and artificial graphites; conductive metal oxides such as tin oxide, titanium oxide and zinc oxide; metals such as nickel, copper, silver and germanium. These conductive agents may be used individually or as a mixture of 2 or more types thereof. The content of the conductive agent is not particularly limited and may be appropriately selected as desired, and it is usually at a ratio of 0.1 to 40 parts by mass, preferably 0.3 to 20 parts by mass, with respect to 100 parts by mass of the total amount of the polyol and the isocyanate.

Examples of the catalyst used for the curing reaction of the urethane foam include monoamines such as triethylamine and dimethylcyclohexylamine; diamines such as tetramethylethylenediamine, tetramethylpropanediamine and tetramethylhexanediamine; triamines such as pentamethyldiethylenetriamine, pentamethyldipropylenetriamine and tetramethylguanidine; cyclic amines such as triethylenediamine, dimethylpiperazine, methylethylpiperazine, methylmorpholine, dimethylaminoethylmorpholine and dimethylimidazole; alcohol amines such as dimethylaminoethanol, dimethylaminoethoxyethanol, trimethylaminoethylethanolamine, methylhydroxyethylpiperazine and hydroxyethylmorpholine; ether amines such as bis(dimethylaminoethyl)ether and ethylene glycol bis(dimethyl)aminopropyl ether; organic metal compounds such as stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenylmercuric propionate and lead octenoate. These catalysts may be used individually or two or more types thereof may be used in combination.

In the present invention, a silicone foam stabilizer and various types of surfactants are preferably mixed in the raw material mixture of the urethane foam in order to stabilize cells of the foam material. As the silicone foam stabilizer, dimethylpolysiloxane-polyoxyalkylene copolymers are preferably used, and those comprising the dimethylpolysiloxane part having a molecular weight of 350 to 15000 and the polyoxyalkylene part having a molecular weight of 200 to 4000 are especially preferred. The molecular structure of the polyoxyalkylene part is preferably an addition polymer of ethylene oxide or an addition copolymer of ethylene oxide and propylene oxide, and its molecular ends are also preferably ethylene oxide. Examples of the surfactant include ionic surfactants such as cationic surfactants, anionic surfactants and ampholytic surfactants; and nonionic surfactants such as various types of polyethers and various types of polyesters. These may be used individually or two or more types thereof may be used in combination. The content of the silicone foam stabilizer and the various types of surfactants is preferably 0.1 to 10 parts by mass, more preferably 0.5 to 5 parts by mass, with respect to 100 parts by mass of the total amount of the polyol component and the isocyanate component.

As the method for foaming the urethane foam in the present invention, it may be possible to use mechanical frothing (a method of mechanical stirring while mixing an inert gas), water frothing and foaming agent-frothing, which have been conventionally used. The inert gas used in the mechanical frothing may be a gas which is inert in the polyurethane reaction, and examples thereof include inert gases in the narrow sense such as helium, argon, xenon, radon and krypton; and gases which are not reactive with the raw material of the urethane foam, such as nitrogen, carbon dioxide and dry air.

Further, in the present invention, it is preferable that the urethane foam layer has, on the surface thereof, cell opening portions communicating through the inside thereof. The existence of the cell opening portions communicating as described above makes it possible to favorably supply the toner from the inside of the urethane foam, solving the problem of instability of the amount of the toner conveyed. Preferably, diameters of the cell opening portions are in a range of 50 to 1000 μm, and the number of the opening portions per square centimeter on the urethane foam surface is in a range of 100 to 2000 pieces. The urethane foam having the cell opening portions described above may be manufactured, by using the polyurethane mixture and the mold release agent, base on the conventional technique.

The shaft body used for the roller according to the present invention is not particularly limited, and it may be possible to use a metal shaft obtained by applying zinc, nickel or other plating to a steel material such as sulfur free-machining steel, or a metal shaft such as cored bar formed by metallic solid body such as iron, stainless steel and aluminum, and metallic tubular body obtained by boring an inside of the cored bar to be a hollow body.

Figure 2:
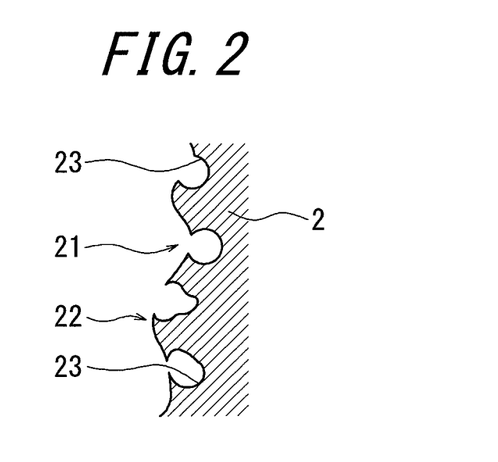
FIG. 2 is an enlarged sectional view schematically illustrating an enlarged cross-section of portion II surrounded by the broken line in FIG. 1.

Then, the toner-conveying roller 10, which is manufactured by using the raw material of the urethane foam, the additives and the mold described above and forming the substantially tubular urethane foam layer 2 around the shaft body 1 as illustrated in FIG. 1, has a substantially cylindrical shape, and on the circumference surface of the urethane foam layer 2, recesses and protrusions (recess 21 and protrusion 22) are irregularly formed, as schematically illustrated in the enlarged sectional view of FIG. 2, which enlarges cross-section of portion II surrounded by the broken line in FIG. 1. Further, on the circumference surface of the urethane foam layer 2, the above-described cell opening portions 23 (opening diameter: 50 to 1000 μm) exist.

It should be noted that the irregularly formed recesses and protrusions on the circumference surface of the urethane foam layer 2 are shaped so as to correspond to the irregularly formed recesses and protrusions on the inner surface of the mold used for manufacturing the toner-conveying roller 10, and, the urethane foam layer 2 has a desired roughness on the circumference surface, for example, the roughness in which, in both circumferential direction and axial direction, the arithmetic mean roughness (Ra) is in a range of 5 to 100 μm, preferably in a range of 8 to 30 μm; the ten-point mean roughness (Rzjis) is in a range of 20 to 400 μm, preferably in a range of 30 to 100 μm; the mean length of roughness curve element (RSm) is in a range of 100 to 2000 μm, preferably in a range of 150 to 800 μm; and, the skewness of roughness curve (Rsk) is in a range of 0 to 2, preferably in a range of 0.2 to 1.2. The roughness on the circumference surface can be controlled by adjusting the roughness of the inner surface of the mold, since the irregularly formed recesses and protrusions on the circumference surface of the urethane foam layer 2 are shaped so as to correspond to the irregularly formed recesses and protrusions on the inner surface of the mold used for manufacturing.

As described above, the toner can be stably conveyed by setting the Ra of the urethane foam layer 2 in the circumferential direction and the axial direction at 5 μm or more, more preferably, at a size larger than or equal to the particle diameter of the toner to be conveyed. Further, by setting the Ra in the circumferential direction and the axial direction at 100 μm or lower, the occurrence of fluffing and tearing of the foam can be further suppressed, and the occurrence of vertical streak in the image can be reduced. Note that, by setting the Ra at 8 μm or more, it is possible to stably convey the toner having the average particle diameter of 3-8 μm, the diameter range in which is suitable for printing high quality image at a high speed. Further, by setting the Ra at 30 μm or lower, it is possible to suppress the occurrence of friction between the mold and the urethane foam layer due to flexibility, stretchability, and lubricity of the urethane foam at the time of removing the manufactured roller from the mold, whereby the fluffing and tearing of the foam are less likely to occur.

Further, by setting the Rzjis of the urethane foam layer 2 in the circumferential direction and the axial direction at 20 μm or more, it is possible to sufficiently secure the height of the protruding portion required for scraping off the toner. Yet further, by setting the Rzjis in the circumferential direction and the axial direction at 400 μm or lower, it is possible to suppress the occurrence of friction between the mold and the urethane foam layer at the time of removing the manufactured roller from the mold, whereby the fluffing and tearing of the foam are less likely to occur.

By setting the RSm of the urethane foam layer 2 in the axial direction at 100 μm or more, the toner can be reliably maintained by the protrusions, whereby it is possible to prevent the toner from slipping down. Further, by setting the RSm in the axial direction at 2000 μm or lower, it is possible to prevent the streak resulting from the protrusion from being transferred to the image.

The toner conveyed by the roller 10 is not particularly limited, and it may be possible to use, for example, a polymerized toner having an average particle diameter in a range of 3 to 8 μm. Incidentally, the toner having the average particle diameter in the range of 3 to 8 μm is suitable for printing the high quality image at a high speed, and the polymerized toner has uniform particle diameters and exhibits high transferring efficiency, as compared with the pulverized toner. This is because the polymerized toner having the uniform particle diameter is piled up in a closest packing manner, and in the case of the roller 10 maintaining and conveying the toner by the recesses, the amount of the toner maintained by the recesses is larger as compared with the case of the pulverized toner. It should be noted that examples of the polymerized toner include a polymerized toner in which, based on a wax, the wax is polymerized with random copolymer of styrene and butyl acrylate containing a charge controlling agent and pigment; polyester thin film is further polymerized on the surface of the thus obtained polymer; and, silica fine particles and the like are externally added. Further, in a case of non-magnetic single-component color polymerized toner, the particle diameter of the toner can be controlled to be small and uniform, and hence, it is possible to easily control the electrification and fluidity and easily lower the melting point thereof, as compared with the case of the conventional toner. Therefore, the non-magnetic single-component color polymerized toner is particularly suitable as a toner for high-quality and high-speed printing.

EXAMPLE

Below, the present invention will be described further in detail by giving examples, but the present invention is not limited to the following examples.

Examples 1-7

Molds were prepared by using the methods described above such that inner surfaces thereof are formed in shapes shown in Table 1 below. Then, by using the prepared molds, toner-conveying rollers having a urethane foam layer at the circumference surface were manufactured by using an ordinary method. For the prepared molds and toner-conveying rollers, evaluations were made through the following methods in terms of roughness of inner surface of mold; roughness of circumference surface of urethane foam layer; toner conveying property; image density; presence or absence of transferring of shape of protrusion to the image, and fluffing and tearing of foam; and, presence or absence of vertical streak in the image. The results are shown in Table 1.

Comparative Example 1

A mold was prepared by using a known method such that an inner surface thereof is formed in a shape shown in Table 1 below (see, for example, Japanese Patent No. 3536598). Then, by using the prepared mold, a toner-conveying roller having a urethane foam layer at the circumference surface was manufactured by using an ordinary method. For the prepared mold and toner-conveying roller, evaluation was made in terms of roughness of inner surface of mold and the like in the same manner as the evaluations of Examples 1-7. The results are shown in Table 1.

Comparative Example 2

A mold was prepared by using a known method such that an inner surface thereof is formed in a shape shown in Table 1 below (see, for example, Japanese Patent Application Laid-open No. 2007-121698). Then, by using the prepared mold, a toner-conveying roller having a urethane foam layer at the circumference surface was manufactured by using an ordinary method. For the prepared mold and toner-conveying roller, evaluation was made in terms of roughness of inner surface of mold and the like in the same manner as the evaluations of Examples 1-7. The results are shown in Table 1.

Comparative Example 3

A toner-conveying roller was prepared by cutting a block of a urethane foam foam to be a tubular shape by grinding with a grindstone or other known method without using any mold. For the prepared toner-conveying roller, evaluation was made in terms of roughness of circumference surface of the urethane foam and the like in the same manner as the evaluations of Examples 1-7. The results are shown in Table 1.

Examples 8-13

Molds were prepared by using the above-described method such that inner surfaces thereof are formed in shapes shown in Table 2 below. Then, by using the prepared molds, toner-conveying rollers having a urethane foam layer at the circumference surface were manufactured by using an ordinary method. For the prepared molds and toner-conveying rollers, evaluations were made in terms of roughness of inner surface of mold and the like in the same manner as the evaluations of Examples 1-7. The results are shown in Table 2.

Comparative Example 4

A mold was prepared by using a known method such that an inner surface thereof is formed in a shape shown in Table 2 below (see, for example, Japanese Patent Application Laid-open No. 2007-121698). Then, by using the prepared mold, a toner-conveying roller having a urethane foam layer at the circumference surface of the toner-conveying roller was manufactured by using an ordinary method. For the prepared mold and toner-conveying roller, evaluation was made in terms of roughness of inner surface of mold and the like in the same manner as the evaluations of Examples 1-7. The results are shown in Table 2.

[Evaluation on Roughness of Inner Surface of Mold]

Evaluation is made on Ra, Rzjis, RSm and Rsk of each test piece in conformity with JIS B0633: 2001, by taking the test piece having a size of 10 mm×10 mm from the molds, and making measurement on the surface of the test piece in the circumferential and the axial directions using a probe-contacting-type surface roughness measurement unit (Surfcom 1400D made by TOKYO SEIMITSU CO., LTD.).

[Evaluation on Roughness of Circumference Surface of Urethane Foam Layer on Roller]

The dimensional profiles of the roller in the circumferential direction and the axial direction are measured such that: a laser-emitting side and a laser-receiving side of a non-contact laser-type dimension measurement unit (made by Keyence Corporation) are placed at a position spaced 3 cm away from an imaginary line passing through a center of an axis body of the roller in the axial direction of the roller; measurement is made of a position at which the laser emitted on the line is blocked by the roller placed between the laser-emitting side and the laser-receiving side; and, a distance from the non-contact laser-type dimension measurement unit to the circumference surface of the urethane foam layer can be continuously measured. Then, from the measured dimensional profile, the Ra, Rzjis, RSm and Rsk are obtained by a method pursuant to JIS

[Toner Conveying Property]

The urethane foam of the thus obtained roller is filled with toner, and is rolled while being pressed 1 mm, and then, the weight of toner discharged from roller at each space formed by width of 220 mm and rolling distance of 50 mm is measured.

[Image Density]

An image-outputting test is performed by assembling the roller to a corresponding printer, and image density is measured by using a Macbeth densitometer. "○ (excellent)" denotes a case where the measured image density satisfies a predetermined value; "Δ (good)" denotes a case where the measured density is equal to the predetermined value; and, "× (poor)" denotes a case where the measured image density does not satisfy a predetermined value.

[Presence/Absence of Transferring of Shape of Protrusion to Image]

An image-outputting test is performed by assembling the roller to a corresponding printer, and visual check is made as to whether the shape of the roller surface is transferred to the outputted image. "○ (excellent)" denotes a case where the shape of the roller surface is not transferred; "Δ (good)" denotes a case where, although the transferring exists, a level thereof is acceptable; and, "× (poor)" denotes a case where the shape of the roller surface is transferred.

[Presence/Absence of Fluffing and/or Tearing of Foam]

An image-outputting test is performed by assembling the roller to a corresponding printer, and visual check is made as to whether the roller after the test has fluffing and/or tearing of foam.

[Vertical Streak in Image]

An image-outputting test is performed by assembling the roller to a corresponding printer, and visual check is made as to whether a vertical streak resulting from fluffing and/or tearing of foam exists in the outputted image. "○ (excellent)" denotes a case where any vertical streak cannot be found; "Δ (good)" denotes a case where, although the vertical streak exists, a level thereof is acceptable; and, "× (poor)" denotes a case where the vertical streak exists.

TABLE 1

| | | Comparative Example 1 | Comparative Example 2 | Comparative Example 3 | Example 1 | Example 2 |
|---|---|---|---|---|---|---|
| Shape of circumference surface of urethane foam layer | | Protruding ridge | Large opening recesses | Polished surface | Irregular recess and protrusion | Irregular recess and protrusion |
| Shape of inner surface of mold | | Recessed groove | Hemisphere-like protrusion | — | Irregular recess and protrusion | Irregular recess and protrusion |
| Regularity of shape of mold and urethane foam layer | | Regular | Irregular | Irregular | Irregular | Irregular |
| Inner surface of mold | Ra [μm] (circumferential/axial direction) | 45/8 | 118/122 | — | 6/5 | 94/96 |
| | Rzjis [μm] (circumferential/axial direction) | 241/24 | 531/504 | — | 20/21 | 392/389 |
| | RSm [μm] (axial direction) | 148 | 2437 | — | 162 | 154 |
| | Rsk [—] (circumferential direction) | −0.2 | −0.1 | — | −0.4 | −0.3 |
| Circumference surface of urethane foam layer | Ra [μm] (circumferential/axial direction) | 41/6 | 115/120 | 69/88 | 6/5 | 95/92 |
| | Rzjis [μm] (circumferential/axial direction) | 210/22 | 541/551 | 371/364 | 20/22 | 390/386 |
| | RSm [μm] (axial direction) | 154 | 2201 | 311 | 148 | 163 |
| | Rsk [—] (circumferential direction) | 0.2 | 0.1 | 0.5 | 0.5 | 0.4 |
| Toner conveying property [g] | | 0.21 | 0.09 | 0.41 | 0.09 | 0.39 |
| Image density | | ○ | × | ○ | Δ | ○ |
| Presence/existence of transferring of protruding shape to image | | × | Δ | ○ | ○ | ○ |
| Fluffing | | Not exist | Not exist | Exist | Not exist | Exist |
| Tearing of foam | | Not exist | Exist | Exist | Not exist | Exist |
| Vertical streak in image | | ○ | Δ | × | ○ | Δ |

| | | Example 3 | Example 4 | Example 5 | Example 6 | Example 7 |
|---|---|---|---|---|---|---|
| Shape of circumference surface of urethane foam layer | | Irregular recess and protrusion | Irregular recess and protrusion | Irregular recess and protrusion | Irregular recess and protrusion | Irregular recess and protrusion |
| Shape of inner surface of mold | | Irregular recess and protrusion | Irregular recess and protrusion | Irregular recess and protrusion | Irregular recess and protrusion | Irregular recess and protrusion |
| Regularity of shape of mold and urethane foam layer | | Irregular | Irregular | Irregular | Irregular | Irregular |
| Inner surface of mold | Ra [μm] (circumferential/axial direction) | 13/12 | 56/71 | 13/15 | 39/38 | 25/24 |
| | Rzjis [μm] (circumferential/axial direction) | 41/33 | 302/332 | 51/49 | 131/125 | 90/87 |
| | RSm [μm] (axial direction) | 102 | 1971 | 162 | 154 | 171 |
| | Rsk [—] (circumferential direction) | −0.4 | −0.5 | −0.1 | −2.0 | −0.6 |
| Circumference surface of urethane foam layer | Ra [μm] (circumferential/axial direction) | 10/11 | 49/57 | 12/13 | 36/41 | 22/21 |
| | Rzjis [μm] (circumferential/axial direction) | 32/28 | 267/316 | 41/46 | 121/116 | 71/66 |
| | RSm [μm] (axial direction) | 106 | 1968 | 159 | 184 | 182 |
| | Rsk [—] (circumferential direction) | 0.4 | 0.6 | 0 | 1.9 | 0.7 |
| Toner conveying property [g] | | 0.11 | 0.24 | 0.06 | 0.27 | 0.28 |
| Image density | | Δ | ○ | Δ | ○ | ○ |
| Presence/existence of transferring of protruding shape to image | | ○ | Δ | ○ | ○ | ○ |
| Fluffing | | Exist | Not exist | Not exist | Exist | Not exist |
| Tearing of foam | | Exist | Not exist | Not exist | Exist | Not exist |
| Vertical streak in image | | Δ | ○ | ○ | Δ | ○ |

TABLE 2

| | Comparative Example 4 | Example 8 | Example 9 | Example 10 | Example 11 | Example 12 | Example 13 |
|---|---|---|---|---|---|---|---|
| Shape of circumference surface of urethane foam layer | Large opening recesses | Irregular recess and protrusion | Irregular recess and protrusion | Irregular recess and protrusion | Irregular recess and protrusion | Irregular recess and protrusion | Irregular recess and protrusion |
| Shape of inner surface of mold | Hemisphere-like protrusion | Irregular recess and protrusion | Irregular recess and protrusion | Irregular recess and protrusion | Irregular recess and protrusion | Irregular recess and protrusion | Irregular recess and protrusion |
| Regularity of shape of mold and urethane foam layer | Irregular | Irregular | Irregular | Irregular | Irregular | Irregular | Irregular |
| Inner surface of mold — Ra [μm] (circumferential/axial direction) | 3/4 | 11/10 | 30/28 | 19/15 | 25/27 | 20/19 | 25/24 |
| Rzjis [μm] (circumferential/axial direction) | 18/19 | 34/35 | 96/98 | 55/51 | 86/87 | 56/50 | 77/78 |
| RSm [μm] (axial direction) | 85 | 171 | 163 | 153 | 782 | 164 | 159 |
| Rsk [—] (circumferential direction) | −0.1 | −0.6 | −0.4 | −0.6 | −0.5 | −0.2 | −1.1 |
| Circumference surface of urethane foam layer — Ra [μm] (circumferential/axial direction) | 4/4 | 9/8 | 29/28 | 17/16 | 23/24 | 19/19 | 22/23 |
| Rzjis [μm] (circumferential/axial direction) | 19/19 | 32/33 | 97/97 | 52/49 | 85/84 | 57/52 | 74/76 |
| RSm [μm] (axial direction) | 87 | 168 | 165 | 155 | 780 | 167 | 162 |
| Rsk [—] (circumferential direction) | 0.1 | 0.5 | 0.6 | 0.6 | 0.4 | 0.2 | 1.2 |
| Toner conveying property [g] | 0.05 | 0.25 | 0.29 | 0.21 | 0.26 | 0.22 | 0.27 |
| Image density | x | ○ | ○ | ○ | ○ | ○ | ○ |
| Presence/existence of transferring of protruding shape to image | ○ | ○ | ○ | ○ | ○ | ○ | ○ |
| Fluffing | Not exist | Not exist | Not exist | Not exist | Not exist | Not exist | Not exist |
| Tearing of foam | Not exist | Not exist | Not exist | Not exist | Not exist | Not exist | Not exist |
| Vertical streak in image | ○ | ○ | ○ | ○ | ○ | ○ | ○ |

From the results of Comparative Examples 1 to 2 and 4, and Examples 1 to 13, it can be known that, according to the toner-conveying roller of the present invention, which is manufactured by using the mold of the present invention, it is possible to provide a toner-conveying roller capable of forming favorable image density and preventing the shape of protrusions from being transferred to the image. Further, from the results of Comparative Example 3 and Examples 1 to 13, it can be known that, according to the toner-conveying roller of the present invention, which is manufactured by using the mold of the present invention, it is possible to provide a roller capable of suppressing occurrence of fluffing and tearing of foam, and reducing the occurrence of vertical streak in the image to an impeccable level, as compared with a roller manufactured by cutting a urethane foam block.

From the results of Examples 1 to 13, it can be known that the circumference surface of the roller is formed such that: the arithmetic mean roughness (Ra) in both circumferential direction and axial direction of the circumference surface are preferably in a range of 5 to 100 μm, more preferably in a range of 8 to 30 μm; the ten-point mean roughness (Rzjis) is preferably in a range of 20 to 400 μm, more preferably in a range of 30 to 100 μm; the mean length of roughness curve element (RSm) in the axial direction of the circumference surface is preferably in a range of 100 to 2000 μm, more preferably in a range of 150 to 800 μm; and, the skewness of roughness curve (Rsk) in the circumferential direction of the circumference surface is preferably in a range of 0 to 2, more preferably in a range of 0.2 to 1.2. Further, it can be known that the inner surface of the mold is formed such that: the arithmetic mean roughness (Ra) in both circumferential direction and axial direction of the inner surface are preferably in a range of 5 to 100 μm, more preferably in a range of 8 to 30 μm; the ten-point mean roughness (Rzjis) is preferably in a range of 20 to 400 μm, more preferably in a range of 30 to 100 μm; the mean length of roughness curve element (RSm) in the axial direction of the inner surface is preferably in a range of 100 to 2000 μm, more preferably in a range of 150 to 800 μm; and, the skewness of roughness curve (Rsk) in the circumferential direction of the inner surface is preferably in a range of −2 to 0, more preferably in a range of −1.2 to −0.2.

The invention claimed is:

1. A toner-conveying roller having a shaft body and a urethane foam layer integrally formed around the shaft body, wherein:
    recesses and protrusions are irregularly formed on a circumferential surface of the urethane foam layer in both circumferential and axial directions of the roller, said recesses and protrusions forming a wavy surface, said urethane foam layer further comprising cell opening portions, and said cell opening portions being larger than a toner size,
    an arithmetic mean roughness Ra of the circumferential surface of the urethane foam layer in the circumferential direction is in a range of 5 to 100 μm,
    a ten-point mean roughness Rzjis of the circumferential surface of the urethane foam layer in the circumferential direction is in a range of 20 to 400 μm,
    an arithmetic mean roughness Ra of the circumferential surface of the urethane foam layer in the axial direction is in a range of 5 to 100 μm,
    a ten-point mean roughness Rzjis of the circumferential surface of the urethane foam layer in the axial direction is in a range of 20 to 400 μm, and
    a mean length of roughness curve element RSm of the circumferential surface of the urethane foam layer in the axial direction is in a range of 100 μm to 2000 μm,
    wherein the arithmetic mean roughness Ra of the circumferential surface of the urethane foam layer in the circumferential direction is greater than the toner size, and
    wherein the toner-conveying roller is configured to supply toner to the surface of a developing roller.

2. The toner-conveying roller according to claim 1, wherein a skewness of roughness curve Rsk of the circumferential surface of the urethane foam layer in the circumferential direction is in a range of 0 to 2.

3. The toner-conveying roller according to claim 1, wherein a first protrusion of said protrusions comprises a first cell opening portion of the cell opening portions.

4. The toner-conveying roller according to claim 1, wherein each of said recesses and protrusions is larger than each of the cell opening portions.

5. A mold for manufacturing a toner conveying roller and the toner conveying roller formed by said mold, said toner conveying roller having a shaft body and a urethane foam layer integrally formed around the shaft body, the roller supplying a toner to the surface of a developing roller, comprising:
- a tubular mold for forming said toner conveying roller, wherein
- recesses and protrusions are irregularly formed on an inner surface of the mold in both circumferential and axial directions of the mold, said recesses and protrusions forming a wavy surface, said urethane foam layer comprising cell opening portions provided on the wavy surface, and the cell opening portions being larger than a toner size,
- an arithmetic mean roughness Ra of the inner surface of the mold in the circumferential direction is in a range of 5 to 100 μm,
- a ten-point mean roughness Rzjis of the inner surface of the mold in the circumferential direction is in a range of 20 to 400 μm,
- an arithmetic mean roughness Ra of the inner surface of the mold in the axial direction is in a range of 5 to 100 μm,
- a ten-point mean roughness Rzjis of the inner surface of the mold in the axial direction is in a range of 20 to 400 μm, and
- a mean length of roughness curve element RSm of the inner surface of the mold in the axial direction is in a range of 100 μm to 2000 μm,
- wherein the arithmetic mean roughness Ra of the inner surface of the mold in the circumferential direction is greater than the toner size.

6. The mold and toner conveying roller according to claim 5, wherein
- a skewness of roughness curve Rsk of the inner surface of the mold in the circumferential direction is in a range of −2 to 0.

7. A method of manufacturing the toner conveying roller by using the mold according to claim 5, the method comprising:
- setting a shaft body in the mold;
- introducing a urethane foam material into the mold; and
- integrally forming the urethane foam layer around the shaft body.

8. A method of manufacturing the toner conveying roller by using the mold according to claim 6, the method comprising:
- setting a shaft body in the mold;
- introducing a urethane foam material into the mold; and
- integrally forming the urethane foam layer around the shaft body.

* * * * *